(12) United States Patent
Asano et al.

(10) Patent No.: US 10,567,721 B2
(45) Date of Patent: Feb. 18, 2020

(54) USING A LIGHT COLOR SENSOR TO IMPROVE A REPRESENTATION OF COLORS IN CAPTURED IMAGE DATA

(71) Applicant: MOTOROLA MOBILITY LLC, Chicago, IL (US)

(72) Inventors: Yuta Asano, Chicago, IL (US); Lin Chen, Chicago, IL (US); Weihua Sun, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 73 days.

(21) Appl. No.: 15/684,399

(22) Filed: Aug. 23, 2017

(65) Prior Publication Data
US 2019/0068938 A1 Feb. 28, 2019

(51) Int. Cl.
*H04N 9/73* (2006.01)
*H04N 1/60* (2006.01)
*H04N 5/232* (2006.01)

(52) U.S. Cl.
CPC .......... *H04N 9/735* (2013.01); *H04N 1/6027* (2013.01); *H04N 1/6077* (2013.01); *H04N 1/6086* (2013.01); *H04N 5/23293* (2013.01)

(58) Field of Classification Search
None
See application file for complete search history.

(56) References Cited

U.S. PATENT DOCUMENTS

| | | | | |
|---|---|---|---|---|
| 5,283,632 A * | 2/1994 | Suzuki | ...... | H04N 9/735 348/223.1 |
| 5,619,347 A * | 4/1997 | Taniguchi | ...... | H04N 9/735 348/223.1 |
| 2004/0179113 A1* | 9/2004 | Suzuki | ...... | H04N 9/735 348/223.1 |
| 2004/0201766 A1* | 10/2004 | Funston | ...... | H04N 5/2351 348/333.02 |
| 2004/0246348 A1* | 12/2004 | Takeshita | ...... | H04N 9/735 348/223.1 |
| 2008/0204573 A1* | 8/2008 | Maeda | ...... | H04N 5/772 348/223.1 |
| 2009/0009624 A1* | 1/2009 | Liu | ...... | H04N 9/735 348/223.1 |
| 2009/0027514 A1* | 1/2009 | Katano | ...... | H04N 9/735 348/223.1 |

(Continued)

*Primary Examiner* — Quan Pham
(74) *Attorney, Agent, or Firm* — Yudell Isidore PLLC

(57) ABSTRACT

A method, a system, and a computer program product for applying a white balance correction to an image data captured by a camera sensor based on a current level of ambient color. The method includes capturing, via a camera sensor, image data of a scene. The method further includes contemporaneously measuring, via a light color sensor, an amount of ambient color. The method further includes calculating a determinant value that represents a magnitude of variance of colors in the scene. The method further includes in response to determining the determinant value is less than a determinant threshold: generating a white balance correction based at least in part on the measured amount of ambient color and applying the white balance correction to the image data to generate a corrected image data having colors that more accurately represent colors in the current scene.

20 Claims, 5 Drawing Sheets

(56) References Cited

U.S. PATENT DOCUMENTS

| | | | |
|---|---|---|---|
| 2012/0153836 A1* | 6/2012 | Shimizu | H05B 33/0815 |
| | | | 315/151 |
| 2012/0320262 A1* | 12/2012 | Chung | H05B 33/0863 |
| | | | 348/370 |
| 2014/0055481 A1* | 2/2014 | Gao | G09G 5/02 |
| | | | 345/589 |
| 2015/0264329 A1* | 9/2015 | Takanashi | H04N 9/735 |
| | | | 348/223.1 |
| 2016/0330368 A1* | 11/2016 | Liu | H04N 5/23293 |
| 2017/0150114 A9* | 5/2017 | Wang | H04N 9/735 |

* cited by examiner

Color Temperature by Ambient Light Color Sensor: 3428K

Determinant Value: 7.1
Color Temperature by Camera: 2712K

420

Color Temperature by Ambient Light Color Sensor: 3074K

404

Determinant Value: 6.1
Color Temperature by Camera: 2764K

USING A LIGHT COLOR SENSOR TO IMPROVE A REPRESENTATION OF COLORS IN CAPTURED IMAGE DATA

BACKGROUND

1. Technical Field

The present disclosure generally relates to electronic devices having camera sensors and in particular to a method for capturing image data having a more accurate representation of colors in a current scene.

2. Description of the Related Art

Many modern personal devices, such as cellular phones, are equipped with cameras that can be used to capture images and/or video in a field of view. During capturing of image data, these cameras measure image statistics for each pixel of the camera. The image statistics are used by an automatic white balance (AWB) algorithm to calculate an adjustment to a white balance of the captured image data. However, unlike the human eye, these cameras are unable to determine whether colors are coming from a light source in a current scene, an object, or both. Thus, in many instances the image statistics recorded by the camera may inaccurately categorize the current scene which causes the AWB algorithm to calculate a white balance adjustment that results in a more inaccurate color reproduction in the image data. For example, traditional AWB algorithms may improperly adjust a white balance of captured image data for scenes having a high degree of wood or carpet surfaces and/or single colors that are misinterpreted by the AWB algorithm as a light source.

BRIEF DESCRIPTION OF THE DRAWINGS

The description of the illustrative embodiments is to be read in conjunction with the accompanying drawings. The patent or application file contains at least one drawing executed in color. Copies of this patent or patent application publication with color drawing(s) will be provided by the United States Patent and Trademark Office upon request and payment of the necessary fee. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
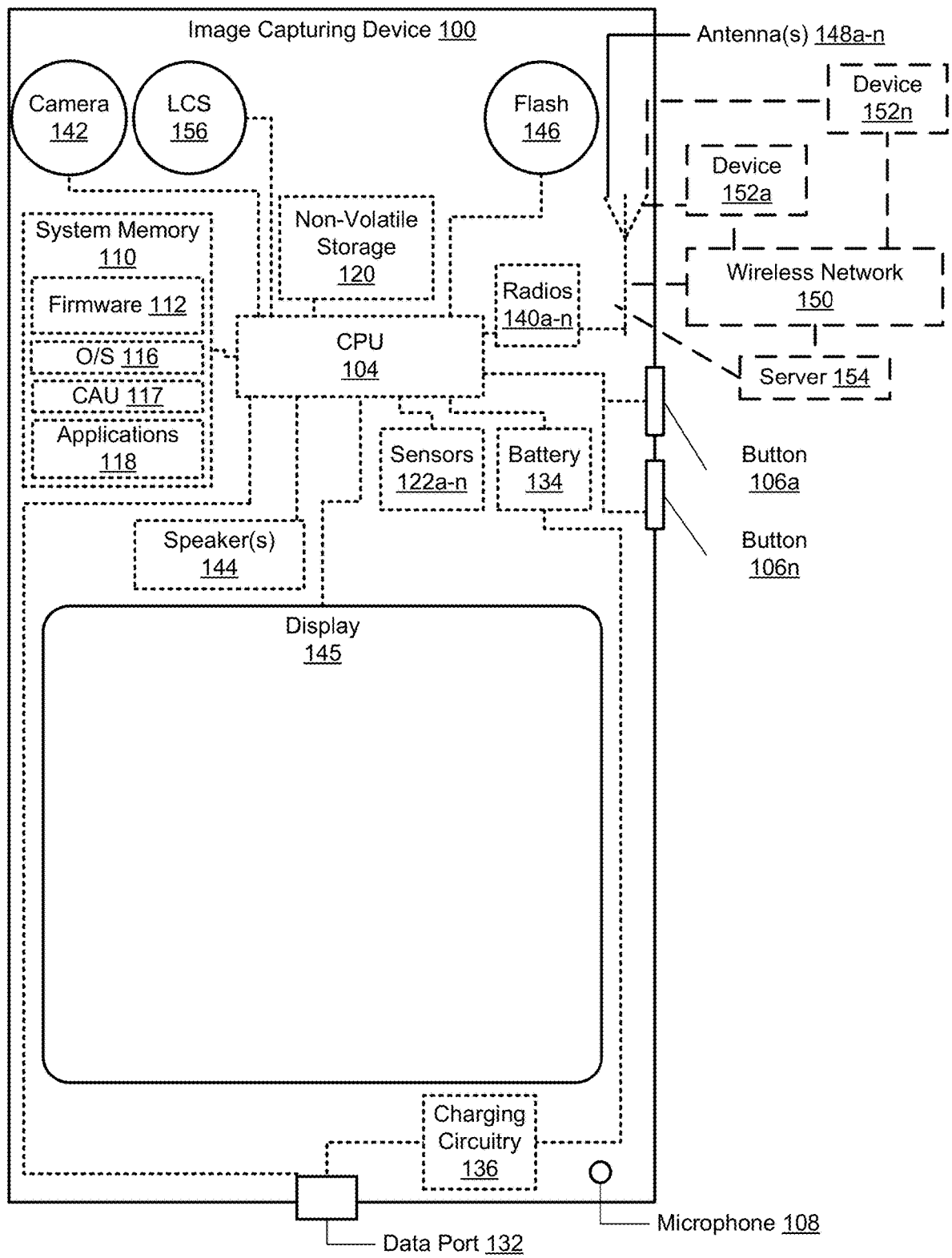
FIG. 1 illustrates an image capturing device within which certain aspects of the disclosure can be practiced, in accordance with one or more embodiments.

The illustrative embodiments provide a method, a system, and a computer program product for applying a white balance correction to an image data captured by a camera sensor, based on a current level of ambient color in a current scene. The method includes capturing, via a camera sensor of an image capturing device, image data of a current scene. The method further includes measuring, via a light color sensor of the image capturing device, an amount of ambient color. The method further includes calculating, based on a covariant matrix which represents all detected colors in the current scene, a determinant value that represents a magnitude of variance of colors in the current scene. The method further includes, in response to determining the determinant value is less than a determinant threshold: generating a white balance correction based at least in part on the amount of ambient color and applying the white balance correction to the image data to generate a corrected image data having colors that more accurately represent colors in the current scene.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within image capturing device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example image capturing device 100 within which one or more of the described features of the various embodiments of the disclosure can be implemented. In at least one embodiment, image capturing device 100 can be any electronic device that is equipped with at least one camera. Example image capturing devices can include, but are not limited to, a desktop computer, a monitor, a notebook computer, a mobile phone, a digital camera, a video recorder, or a tablet computer. Image capturing device 100 includes at least one processor or central processing unit (CPU) 104. CPU 104 is coupled to non-volatile storage 120 and system memory 110, within which firmware 112, operating system (OS) 116, color adjustment utility (CAU) 117, and applications 118 can be stored for execution by CPU 104. According to one aspect, CAU 117 executes within image capturing device 100 to perform the various methods and functions described herein. In one or more embodiments, CAU 117 calculates a white balance correction based on a current level of ambient color in a current scene and applies the white balance correction to an image data captured by a camera sensor. For simplicity, CAU 117 is illustrated and described as a stand-alone or separate software/firmware/logic component, which provides the specific functions and methods described below. However, in at least one embodiment, CAU 117 may be a component of, may be combined with, or may be incorporated within firmware 112, or OS 116, and/or within one or more of applications 118.

As shown, image capturing device 100 may include input devices and output devices that enable a user to interface with image capturing device 100. In the illustrated embodiment, image capturing device 100 includes camera 142, flash 146, display 145, light color sensor (LCS) 156, hardware buttons 106a-n, microphone(s) 108, and speaker(s) 144. Camera 142 is used to captured image data in a current scene. In one or more embodiments, camera 142 is a Bayer camera sensor. While only one camera is illustrated, in other embodiments, image capturing device 100 can include multiple cameras, which may be positioned on a same side/face or different sides/faces of image capturing device 100. Flash 146 is utilized to illuminate objects in a scene with artificial light. Light color sensor 156 is utilized to measure ambient color in a current scene. While only one color sensor is illustrated, in some embodiments light color sensor 156 includes multiple color sensors. For example, image capturing device 100 may include a color sensor within each of a top portion and a bottom portion of a same face/side of image capturing device 100. Hardware buttons 106a-n are selectable buttons that are used to receive manual/tactile input from a user to control specific operations of image capturing device 100 and/or of applications executing thereon. In at least one embodiment, hardware buttons 106a-n may also include, or may be connected to, one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of image capturing device 100. In at least one embodiment, hardware buttons 106a-n may include a keyboard. Microphone(s) 108 may be used to receive spoken input/commands from a user. Speaker(s) 144 is used to output audio signals.

CPU 104 is also coupled to sensors 122a-n and display 145. Sensors 122a-n can include, but are not limited to, at least one of: infrared (IR) sensors, time-of-flight emitters/receivers, structured light emitters/receivers, thermal sensors, light sensors, motion sensors and/or accelerometers, proximity sensors, and camera/image sensors. Display 145 is capable of displaying text, media content—including images and video, and/or a graphical user interface (GUI) associated with or generated by firmware and/or software executing on image capturing device 100. The GUI can be rendered by CPU 104 for viewing on display 145, in at least one embodiment, or can be rendered by a graphics processing unit (GPU) (not separately shown), in another embodiment. In at least one embodiment, display 145 is a touch screen that is capable of receiving touch/tactile input from a user of image capturing device 100. In at least one embodiment, image capturing device 100 can include a plurality of virtual buttons or affordances that operate in addition to, or in lieu of, hardware buttons 106a-n. For example, image capturing device 100 can be equipped with a touch screen interface and provide, via a GUI, a virtual keyboard or other virtual icons for user interfacing therewith.

Image capturing device 100 also includes data port 132 (e.g., a universal serial bus (USB) port), battery 134, and charging circuitry 136. Data port 132 can operate as a charging port that receives power via an external charging device (not pictured) for charging battery 134 via charging circuitry 136. Data port 132 may also function as one of an input port, an output port, and a combination input/output port for exchanging data via a serial or parallel connection with another device. Battery 134 may include a single battery or multiple batteries for providing power to components of image capturing device 100. In at least one embodiment, battery 134 may include at least one battery that is removable and/or replaceable by an end user. In another embodiment, battery 134 may include at least one battery that is permanently secured within/to image capturing device 100.

Image capturing device 100 may also include one or more wireless radios 140a-n and can include one or more antenna(s) 148a-n that enable image capturing device 100 to wirelessly connect to, and transmit and receive voice and/or data communication to/from, one or more other devices, such as devices 152a-n and server 154. As a wireless device, image capturing device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, image capturing device 100 may be further equipped with infrared (IR) device (not pictured) for communicating with other devices using an IR connection. In another embodiment, wireless radios 140a-n may include a short-range wireless device, including, but not limited to, a near field communication (NFC) device. In still another embodiment, image capturing device 100 may communicate with one or more other device(s) using a wired or wireless USB connection.

Figure 2:
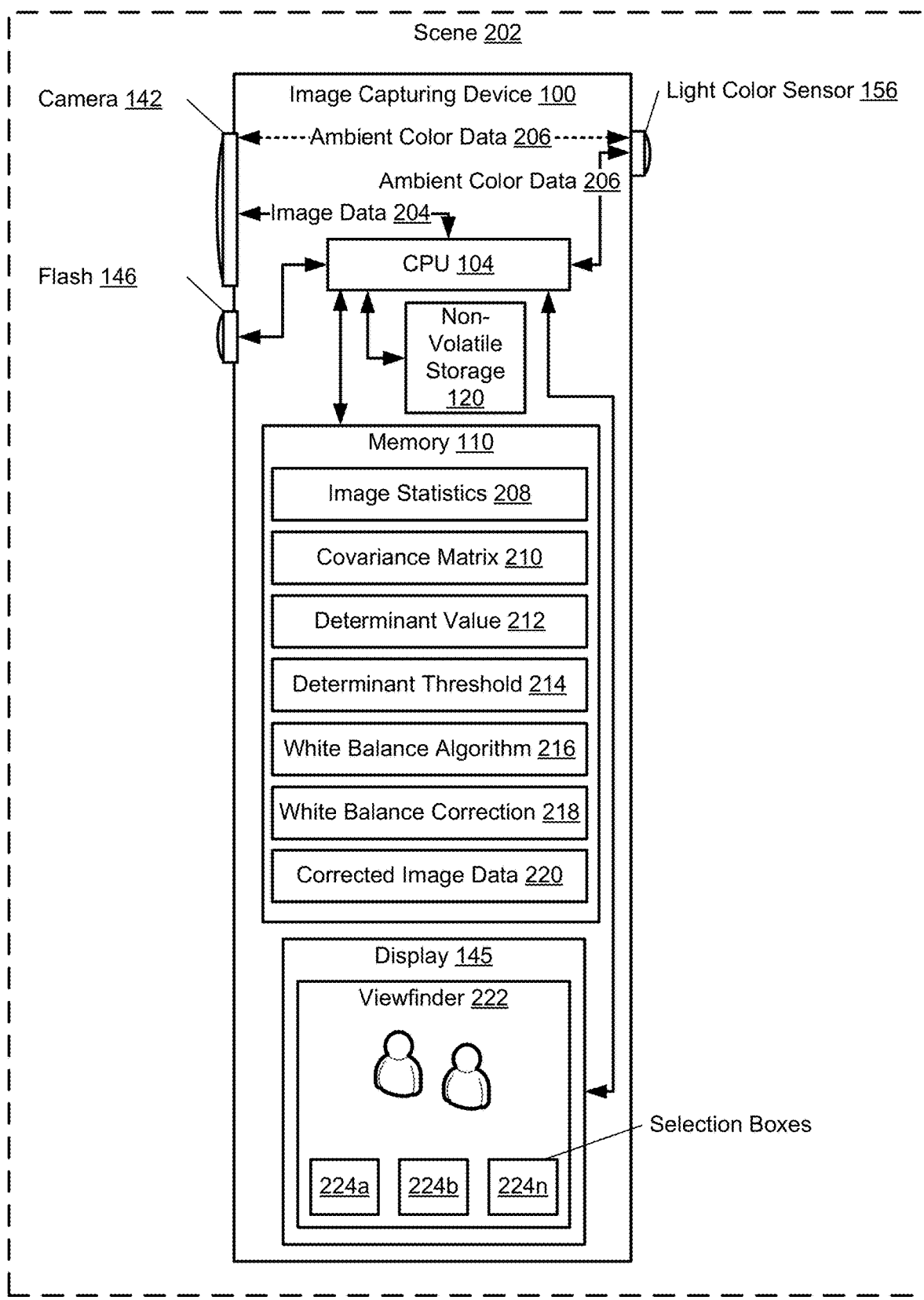
FIG. 2 illustrates an example image capturing device configured to apply a white balance correction to an image data captured by a camera sensor based on a current level of ambient color in a current scene, in accordance with one or more embodiments.

FIG. 2 is a block diagram illustrating additional functional components within example image capturing device 100, which is configured to apply a white balance correction to image data captured by a camera sensor, based on a current level of ambient color in a current scene, in accordance with one or more embodiments of the present disclosure. As illustrated, image capturing device 100 includes CPU 104, which executes CAU 117. Image capturing device 100 also includes memory 110, non-volatile storage 120, camera 142, display 145, flash 146, and light color sensor 156. In one or more embodiments, light color sensor 156 is attached to a different side of image capturing device 100 than camera 142. In the illustrated embodiment, camera 142 and flash 146 are attached to a first side/face (e.g., a rear side) of image capturing device 100 and are facing in a first direction. In the illustrated embodiment, light color sensor 156 is attached to a second side of image capturing device 100 and is facing in a second direction that is opposite the first direction.

Camera 142 is utilized by image capturing device 100 to capture image data 204 in current scene 202. It should be noted that image data 204 may include a single image, multiple/burst image, and/or video. Camera 142 records image statistics 208 contemporaneously with image data 204. Image statistics 208 can include color and luminance values for each pixel within a captured field of view of camera 142. CPU 104 utilizes the color values within image statistics 208 to identify all colors captured within image data 204. CPU 104 calculates/generates covariance matrix 210, which represents all detected colors in current scene 202 (as included within image statistics 208). Using a first example image data, CPU 104 generates the following covariance matrix 210:

$$M_{Covariance}\begin{bmatrix} 216.1 & -312.9 \\ -312.9 & 916.7 \end{bmatrix}$$

In response to generating covariance matrix 210, CPU 104 calculates determinant value 212 from the covariance matrix 210. Determinant value 212 represents a magnitude of variance of colors in current scene 202. Using the example covariance matrix 210 above, CPU 104 calculates determinant value 212 as 100192.6 (determinant value= (216.1*916.7)−(−312.9*−312.9)). CPU 104 then compares the calculated determinant value 212 to determinant threshold 214. According to one aspect, determinant threshold 214 is a predetermined value that represents a trigger point for applying a white balance correction (e.g., white balance correction 218) to captured image data 204. In at least one embodiment, determinant threshold 214 can be preprogramed into image capturing device 100 by a manufacturer or enterprise associated with image capturing device 100.

In another embodiment, determinant threshold 214 can be entered by a user by an input device (e.g., touch screen) of image capturing device 100. In the embodiment where determinant threshold 214 can be entered by a user, CPU 104 presents a real-time view (e.g., viewfinder 222) of a current scene that is being viewed by camera 142. CPU 104 renders selection boxes 224a-n on viewfinder 222. Each of selection boxes is associated with a different pre-defined camera setting of a camera application of image capturing device 100. By selecting a particular camera setting, a user of image capturing device 100 can adjust the value of determinant threshold 214 to a value associated with that particular camera setting. For example, selection box 224a is associated with an aggressive correction setting, selection box 224b is associated with a moderate correction setting, and selection box 224n is associated with a minimum correction setting. For example, a user may select a camera setting from among one or more predefined camera settings (e.g., aggressive correction, moderate correction, minimum correction). In another embodiment, a user of image capturing device may manually enter a particular determinant threshold 214 via an input device (e.g., an on-screen keyboard displayed on a touchscreen).

In response to determining that determinant value 212 is greater than determinant threshold 214, CPU 104 provides the uncorrected image data 204 to an output device (e.g., display 145) of image capturing device 100, without applying any white balance correction. In another embodiment, CPU 104 stores the original image data 204 to non-volatile storage 120, network storage, and/or a cloud based service for storing captured images. For example, for a determinant threshold 214 of 5000, CPU 104 does not apply any white balance correction (e.g., white balance correction 218) to image data 204 and provides the original image data 204 to display 145.

In response to determining determinant value 212 is less than determinant threshold 214, CPU 104 measures, by light color sensor 156, an amount of ambient color (e.g., ambient color data 206) in current scene 202. In at least one embodiment, ambient color data 206 includes color measured from light sources and/or color reflecting off objects and/or surfaces in current scene 202. In one or more embodiments, the measurement of ambient color data 206 includes tristimulus values that are a measurement of light intensity of the three primary color values (red, green, and blue). The tristimulus values may be represented in a series of coordinates.

In at least one embodiment, the measurement of ambient color data 206 by light color sensor 156 is triggered in response to determining that determinant value 212 is less than determinant threshold 214. In another embodiment, light color sensor 156 continuously monitors current scene 202 such that a real-time measurement of ambient color data 206 in current scene 202 is always maintained and the real-time measurement of ambient color data 206 is contemporaneously recorded with the capture of image data 204. In another embodiment, light color sensor 156 only continuously monitors current scene 202 during a usage of camera 142 on image capturing device 100 and/or while a particular application (e.g., a camera application) is active on image capturing device 100. In still another embodiment, light color sensor 156 is directly connected to camera 142 and provides a real-time measurement of ambient color data 206 that is recorded within image data 204 (e.g., as metadata) and/or within image statistics 208 at the time of capture of image data 204.

In response to measuring ambient color data 206, CPU 104 utilizes the measurement of ambient color data 206 as an input to white balance algorithm 216 to calculate white balance correction 218 that is to be applied to image data 204. In another embodiment, CPU 104 can first convert the tristimulus values to a color temperature (in Kelvins (K)), which may be used by white balance algorithm 216 to calculate a white balance correction 218, which can be applied to image data 204 to correct a color temperature of image data 204. In at least one embodiment, white balance correction 218 includes an adjustment to a red-green balance and/or a blue-green balance in image data 204.

In response to calculating white balance correction 218, CPU 104 applies white balance correction 218 to image data 204 to generate corrected image data 220. CPU 104 provides corrected image data 220, which includes white balance correction 218, to an output device (e.g., display 145) of image capturing device 100. In another embodiment, CPU 104 stores corrected image data 220 to non-volatile storage 120, network storage, and/or a cloud based service for storing captured images. In still another embodiment, CPU 104 may also separately store and/or output the original image data 204.

Figure 3B:
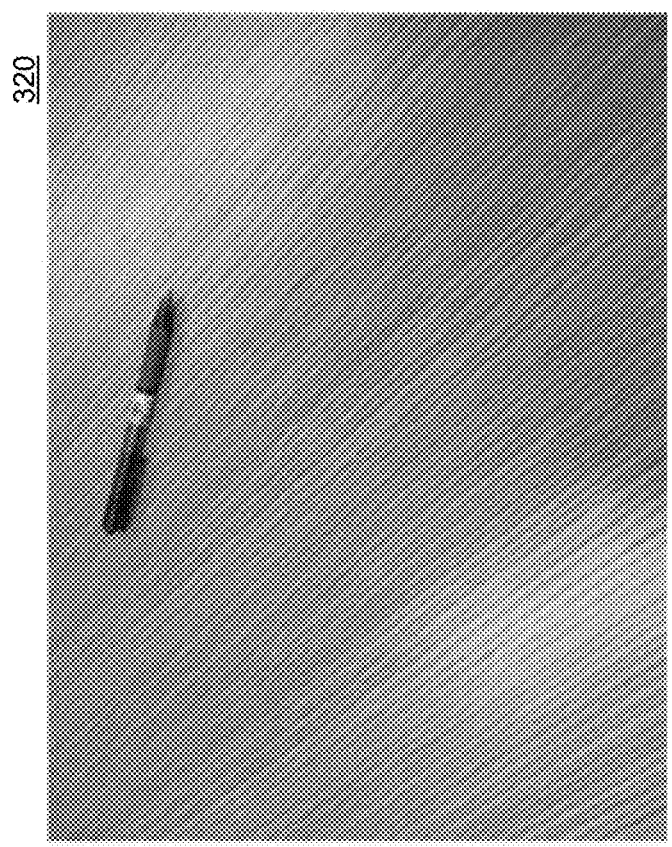
FIG. 3B is a photograph that illustrates a first corrected image corresponding to the first non-corrected image of FIG. 3A, and which incorporates a white balance correction based on a measured ambient color level of a light color sensor, in accordance with one embodiment.
Figure 3A:
FIG. 3A is a photograph that illustrates a first non-corrected image captured by a camera sensor, in accordance with one embodiment.

FIGS. 3A-B respectively provide a first example non-corrected image captured by a camera sensor and a first corrected image corresponding to the first example non-corrected image, in accordance with one embodiment. In the depicted scene of FIGS. 3A-B, the camera estimates the color temperature at 2712$k$ while the light color sensor 156 estimates the color temperature at 3428$k$. As provided by example non-corrected image data 304 of FIG. 3A, CPU 104 has determined a corresponding determinant value (e.g., determinant value 212) to be 7.1, which is below determinant threshold 214 (e.g., 5000). FIG. 3B illustrates a first example corrected image data 320, which includes a white balance correction that is generated by CPU 104. The white balance correction is calculated by CPU 104 based on a real-time measurement of ambient color data 206 by light color sensor 156 in response to determining that the determinant value of the first example non-corrected image data 304 is below the determinant threshold. As shown, the white balance correction increased a red portion of a red-green color balance of non-corrected image data 304 to create corrected image data 320. The increased white balance correction results in corrected image data 320 appearing warmer than non-corrected image data 304.

Figure 4B:
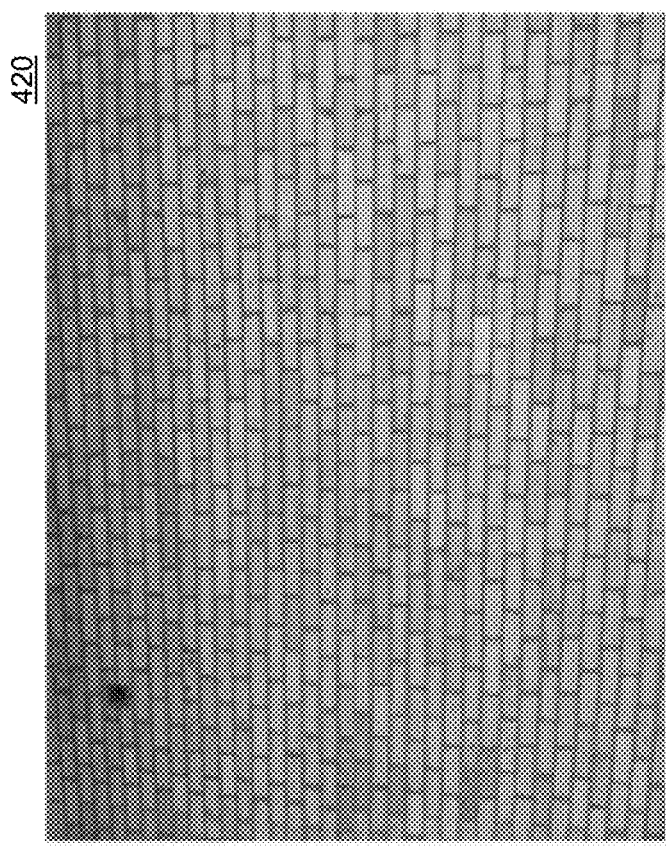
FIG. 4B is a photograph that illustrates a second corrected image corresponding to the second non-corrected image of FIG. 4A, and which incorporates a white balance correction based on a measured ambient color level of a light color sensor, in accordance with one embodiment.
Figure 4A:
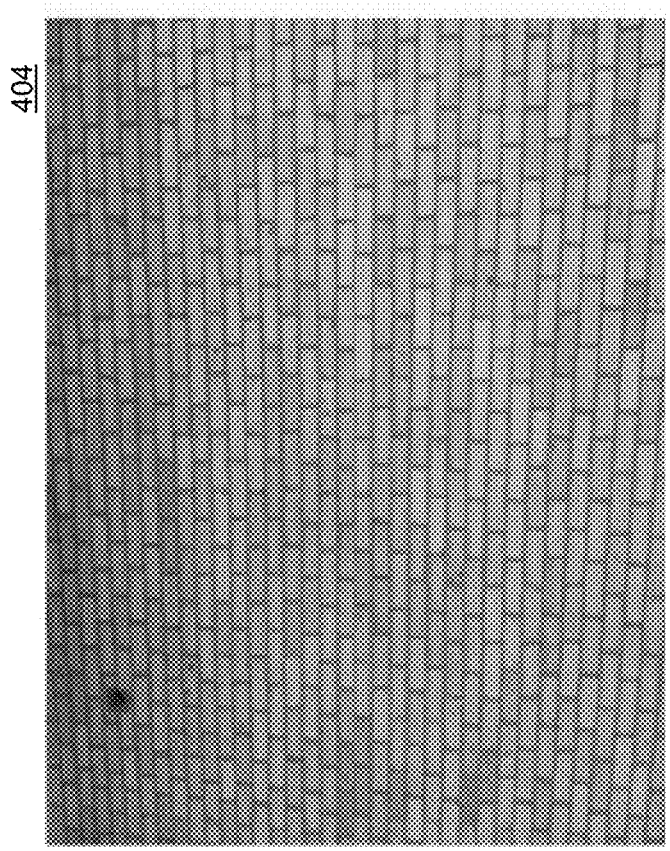
FIG. 4A is a photograph that illustrates a second non-corrected image that utilizes a color temperature detected by only a camera sensor, in accordance with one embodiment.

Referring now to FIGS. 4A-4B there are pictured a second example non-corrected image captured by a camera sensor and a second corrected image corresponding to the second example non-corrected image, in accordance with one embodiment. In the depicted scene of FIGS. 4A-B, the camera estimates the color temperature at 2764$k$ while the light color sensor 156 estimates the color temperature at 3074$k$. As provided by example non-corrected image data 404 of FIG. 4A, CPU 104 has determined a corresponding determinant value (e.g., determinant value 212) to be 6.1, which is below determinant threshold 214 (e.g., 5000). FIG. 4B is a photograph that illustrates a second example corrected image data 420, which includes a white balance correction, that is generated by CPU 104 in response to determining that the determinant value of the second example non-corrected image data 404 is below the determinant threshold. As shown, the white balance correction has increased a red portion of a red-green color balance of non-corrected image data 404 to create corrected image data 420. The increased white balance correction results in corrected image data 420 appearing warmer than non-corrected image data 404.

Figure 5:
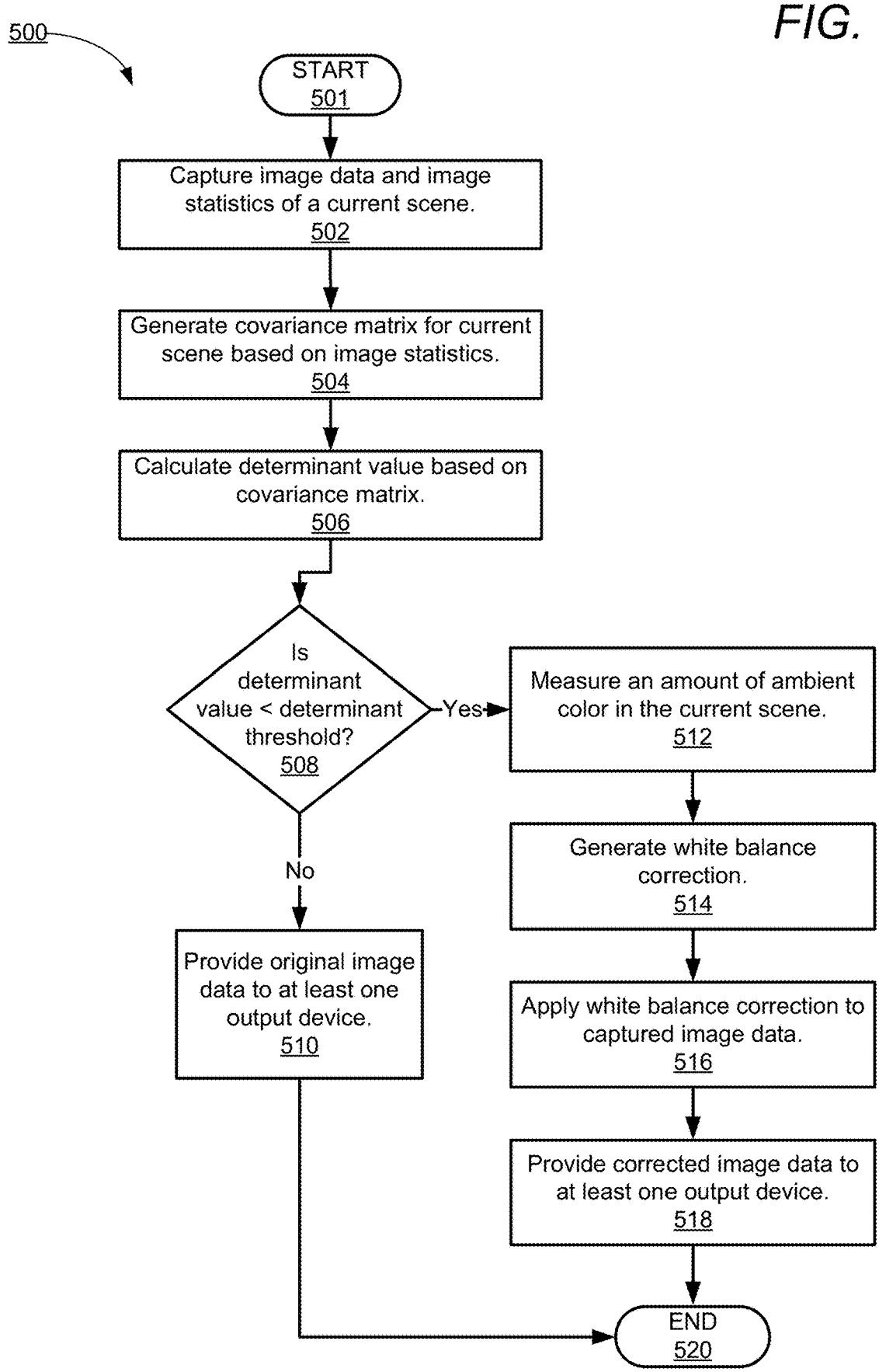
FIG. 5 is a flow chart illustrating a method for correcting a white balance in image data captured by a camera sensor based on a measured ambient color level, in accordance with one or more embodiments.

Referring now to FIG. 5, there is depicted a high-level flow-chart illustrating a method for applying a white balance correction to an image data captured by a camera sensor, based on a current level of ambient color in a current scene, in accordance with one or more embodiments of the present disclosure. Aspects of the method are described with reference to the components of FIGS. 1 and 2. Several of the processes of the method provided in FIG. 5 can be implemented by a processor (e.g., CPU 104) executing software code of CAU 117 within an image capturing device (e.g., image capturing device 100). The method processes described in FIG. 5 are generally described as being performed by components of image capturing device 100.

Method 500 commences at initiator block 501 then proceeds to block 502. At block 502, image capturing device 100 captures image data 204, including image statistics 208, via camera 142. At block 504, CPU 104 generates, based, at least in part, on light intensity information within image statistics 208, covariance matrix 210, which represents all detected colors in current scene 202. At block 506, CPU 104 calculates determinant value 212, which represents a magnitude of variance of colors in current scene 202 (as indicated by covariance matrix 210). At block 508, CPU 104 retrieves determinant threshold 214 from a memory (e.g., system memory 110) of image capturing device 100 and determines whether determinant value 212 is less than determinant threshold 214. In response to determining at block 508 that determinant value 212 is greater than or equal to determinant threshold 214, CPU 104 provides the original image data 204, without modification, to at least one output device (e.g., display 145) and/or stores the original image data 204 to non-volatile storage 120 (block 510). Method 500 then terminates at block 520.

In response to determining at block 510 that determinant value 212 is less than determinant threshold 214, light color sensor 156 measures an amount of ambient color data 206 in current scene 202 (block 512). It should be noted that in another embodiment, light color sensor 156 contemporaneously measures ambient color data 206 in current scene 202 with the capture of image data 204. In at least one embodiment, light color sensor 156 is attached to an opposite side of image capturing device 100 and aligned in an opposite direction as camera 142. At block 514, CPU 104 generates, white balance algorithm 216, white balance correction 218 based at least in part on the measured amount of ambient color data 206 in current scene 202 as measured by light color sensor 156. At block 516, CPU 104 applies the white balance correction to image data 204. At block 518, CPU 104 provides corrected image data 220, with the white balance correction, to at least one output device (e.g., display 145) and/or stores corrected image data 220 to non-volatile storage 120. Method 500 then terminates at block 520.

In the above-described flow chart of FIG. 5, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   capturing, using a camera sensor of an image capturing device, image data of a current scene;
   calculating, based on a covariant matrix which represents all detected colors in the current scene, a determinant value that represents a magnitude of variance of colors in the current scene; and
   in response to determining that the determinant value is less than a determinant threshold that represents a trigger point for applying a white balance correction to the image data:

measuring, via a light color sensor of the image capturing device, an amount of ambient color in the current scene;
generating the white balance correction based at least in part on the amount of ambient color; and
applying the white balance correction to the image data to generate a corrected image data having colors that more accurately represent colors in the current scene;
wherein the determinant threshold is determined based on user selection of a particular camera setting from among multiple camera settings.

2. The method of claim 1, further comprising:
recording image statistics contemporaneously with the capturing of the image data, the image statistics comprising color and luminance values for each pixel within a captured field of view of the camera sensor;
identifying all colors captured within the image data utilizing the color values within the image statistics; and
generating the covariance matrix, based at least in part on light intensity information within the image statistics.

3. The method of claim 1, further comprising:
in response to determining the determinant value is greater than the determinant threshold, providing the image data to at least one output device; and
in response to generating the corrected image data, providing the corrected image data to the at least one output device.

4. The method of claim 1, wherein:
the camera sensor is attached to a first side of the image capturing device and aligned in a first direction; and
the light color sensor is attached to a second side of the image capturing device, aligned in a second direction that is opposite the first direction.

5. The method of claim 1, wherein applying the white balance correction to the image data further comprises:
adjusting at least one of a red-green balance and a blue-green balance in the image data.

6. The method of claim 1, wherein the measured amount of ambient color is measured as color tristimulus values, and in applying the white balance correction to the image data, the method further comprises:
converting the measured color tristimulus values to a measured color temperature;
generating the white balance correction based at least in part on the measured color temperature; and
applying the measured color temperature to the image data to replace an original color temperature associated with the image data.

7. The method of claim 6, wherein the measured color tristimulus values comprise three primary color values, the method further comprising:
calculating, via a white balance algorithm, the white balance correction utilizing the measured color temperature.

8. The method of claim 1, wherein determining the determinant threshold based on user input, further comprises:
presenting a real-time view of a current scene that is being viewed by the camera sensor;
rendering selection boxes within the real-time view, each selection box associated with a different pre-defined camera setting of a camera application of the image capturing device;
receiving the selection of the particular camera setting; and
adjusting a value of the determinant threshold to a value associated with the particular camera setting.

9. An image capturing device comprising:
at least one camera sensor that captures image data of a current scene;
at least one light color sensor that measures an amount of ambient color; and
at least one processor that:
calculates, based on a covariant matrix which represents all detected colors in the current scene, a determinant value that represents a magnitude of variance of colors in the current scene; and
in response to determining that the determinant value is less than a determinant threshold that represents a trigger point for applying a white balance correction to the image data:
measures, via the light color sensor, the amount of ambient color in the current scene;
generates the white balance correction based at least in part on the amount of ambient color; and
applies the white balance correction to the image data to generate a corrected image data having colors that more accurately represent colors in the current scene;
wherein the determinant threshold is determined based on user selection of a particular camera setting from among multiple camera settings.

10. The image capturing device of claim 9, wherein the at least one processor:
records image statistics contemporaneously with the capturing of the image data, the image statistics comprising color and luminance values for each pixel within a captured field of view of the camera sensor;
identifies all colors captured within the image data utilizing the color values within the image statistics; and
generates the covariance matrix, based at least in part on light intensity information within the image statistics.

11. The image capturing device of claim 9, wherein the at least one processor:
in response to determining the determinant value is greater than the determinant threshold, provides the image data to at least one output device; and
in response to generating the corrected image data, provides the corrected image data to the at least one output device.

12. The image capturing device of claim 9, wherein:
the at least one camera sensor is attached to a first side of the image capturing device and aligned in a first direction; and
the at least one light color sensor is attached to a second side of the image capturing device, aligned in a second direction that is opposite the first direction.

13. The image capturing device of claim 9, wherein in applying the white balance correction to the image data, the at least one processor:
adjusts at least one of a red-green balance and a blue-green balance in the image data.

14. The image capturing device of claim 9, wherein the measured amount of ambient color is measured color tristimulus values, and wherein, in applying the white balance correction to the image data, the at least one processor:
converts the measured color tristimulus values to a measured color temperature;
generates the white balance correction based at least in part on the measured color temperature; and applies the measured color temperature to the image data to replace an original color temperature associated with the image data.

15. The image capturing device of claim 9, wherein in determining the determinant threshold based on user input, the at least one processor:
   presents a real-time view of a current scene that is being viewed by the camera sensor;
   renders selection boxes within the real-time view, each selection box associated with a different pre-defined camera setting of a camera application of the image capturing device;
   receives the selection of the particular camera setting; and
   adjusts a value of the determinant threshold to a value associated with the particular camera setting.

16. A computer program product comprising:
   a computer readable storage device; and
   program code on the computer readable storage device that, when executed by a processor associated with an image capturing device, enables the image capturing device to provide the functionality of:
   capturing, via a camera sensor, image data of a current scene;
   calculating, based on a covariant matrix which represents all detected colors in the current scene, a determinant value that represents a magnitude of variance of colors in the current scene; and
   in response to determining that the determinant value is less than a determinant threshold that represents a trigger point for applying a white balance correction to the image data:
      measuring, via a light color sensor of the image capturing device, an amount of ambient color in the current scene;
      generating the white balance correction based at least in part on the amount of ambient color; and
      applying the white balance correction to the image data to generate a corrected image data having colors that more accurately represent colors in the current scene;
   wherein the determinant threshold is determined based on a user selection of a particular camera setting from among multiple camera settings.

17. The computer program product of claim 16, further comprising program code that enables the image capturing device to provide the functionality of:
   recording image statistics contemporaneously with the capturing of the image data, the image statistics comprising color and luminance values for each pixel within a captured field of view of the camera sensor;
   identifying all colors captured within the image data utilizing the color values within the image statistics; and
   generating the covariance matrix, based at least in part on light intensity information within the image statistics.

18. The computer program product of claim 16, wherein:
   the camera sensor is attached to a first side of the image capturing device and aligned in a first direction; and
   the light color sensor is attached to a second side of the image capturing device, aligned in a second direction that is opposite the first direction.

19. The computer program product of claim 16, wherein applying the white balance correction to the image data further comprises:
   adjusting at least one of a red-green balance and a blue-green balance in the image data.

20. The computer program product of claim 16, wherein the program code for determining the determinant threshold based on user input, further comprises code for:
   presenting a real-time view of a current scene that is being viewed by the camera sensor;
   rendering selection boxes within the real-time view, each selection box associated with a different pre-defined camera setting of a camera application of the image capturing device;
   receiving the selection of the particular camera setting; and
   adjusting a value of the determinant threshold to a value associated with the particular camera setting.

* * * * *